(12) United States Patent
Choi

(10) Patent No.: US 11,909,328 B2
(45) Date of Patent: Feb. 20, 2024

(54) SUBMODULE FOR CONVERSION OF DIRECT CURRENT POWER AND METHOD FOR UPDATING PROGRAM FOR SUBMODULE

(71) Applicant: HYOSUNG HEAVY INDUSTRIES CORPORATION, Seoul (KR)

(72) Inventor: Dong Min Choi, Suwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 202 days.

(21) Appl. No.: 17/427,388

(22) PCT Filed: Dec. 30, 2019

(86) PCT No.: PCT/KR2019/018754
§ 371 (c)(1),
(2) Date: Jul. 30, 2021

(87) PCT Pub. No.: WO2020/162664
PCT Pub. Date: Aug. 13, 2020

(65) Prior Publication Data
US 2022/0129054 A1    Apr. 28, 2022

(30) Foreign Application Priority Data
Feb. 8, 2019   (KR) .......................... 10-2019-0015221

(51) Int. Cl.
*G06F 1/26* (2006.01)
*H02M 7/483* (2007.01)
*H02M 3/04* (2006.01)

(52) U.S. Cl.
CPC .......... *H02M 7/4835* (2021.05); *G06F 1/263* (2013.01); *G06F 1/266* (2013.01); *H02M 3/04* (2013.01); *H02M 7/483* (2013.01)

(58) Field of Classification Search
CPC ....................................................... G06F 1/26
See application file for complete search history.

(56) References Cited

U.S. PATENT DOCUMENTS

| 10,303,231 B2* | 5/2019 | Matsuda ................. G06F 9/445 |
| 10,983,785 B1* | 4/2021 | Bryan ....................... G06F 8/65 |

(Continued)

FOREIGN PATENT DOCUMENTS

| CN | 107168052 A | 9/2017 |
| EP | 2937986 A1 | 10/2015 |

(Continued)

*Primary Examiner* — Phil K Nguyen
(74) *Attorney, Agent, or Firm* — NKL Law; Jae Youn Kim

(57) ABSTRACT

A submodule for conversion of DC power capable of a plurality thereof being connected in series and used for DC-DC conversion in accordance with the present invention comprises: a power switching element for switching DC power supply to convert a source of DC including voltage transformation; a DC capacitor for storing DC power opened or closed by the power switching element; a power supply unit for supplying power required to drive the submodule from the DC capacitor; a submodule controller for controlling whole operation of the submodule; memory for storing data required for operating the submodule controller; and a communicating unit for performing data communication with an external device; wherein the submodule controller may perform a program update during a start sequence of the submodule or during a stop sequence thereof, while DC-DC conversion is operated.

5 Claims, 14 Drawing Sheets

(56) References Cited

U.S. PATENT DOCUMENTS

| | | | |
|---|---|---|---|
| 2008/0086652 A1* | 4/2008 | Krieger | G06F 8/65 |
| | | | 713/330 |
| 2012/0124568 A1* | 5/2012 | Fallon | G06F 9/453 |
| | | | 717/169 |
| 2017/0205861 A1* | 7/2017 | Matsuda | G06F 8/654 |
| 2017/0228302 A1 | 8/2017 | Chiang et al. | |
| 2017/0373610 A1* | 12/2017 | White | H02M 7/53871 |
| 2018/0059755 A1* | 3/2018 | Kojima | G06F 1/263 |
| 2020/0334036 A1* | 10/2020 | Shimura | G06F 8/65 |

FOREIGN PATENT DOCUMENTS

| | | |
|---|---|---|
| EP | 3410590 A1 | 12/2018 |
| JP | 2016-112909 A | 6/2016 |
| KR | 10-1758301 B1 | 7/2017 |
| KR | 10-2018-0113160 A | 10/2018 |
| WO | 2009-046132 A | 4/2009 |

* cited by examiner

Store the image file of the submodule program in the memory in the VBE

SUBMODULE FOR CONVERSION OF DIRECT CURRENT POWER AND METHOD FOR UPDATING PROGRAM FOR SUBMODULE

FIELD OF THE INVENTION

The present invention relates to a submodule for conversion of direct current (DC) power capable of being used for a DC-DC converter for converting DC power to a desired level without converting DC to alternating current (AC) and a method of updating a program of the submodule, and more particularly to, the submodule for conversion of DC applicable as a unit switching submodule of a modular multilevel converter (MMC) as a DC-DC converter for HVDC, and the method of updating the program of the submodule.

BACKGROUND OF THE INVENTION

Even during a process of converting DC to DC thanks to the easiness of changing voltages by using transformers, a method of converting DC to AC, transforming voltage, and then converting to DC again has been used for a long time.

Recently, development of power electronics components and rapid development of technology of effectively controlling multiple power components on and off are expanding the fields to which DC-DC converters for converting DC to DC are applied. In other words, areas in a field of high voltage direct current transmission systems using high-voltage high-power solid-state transformer technology are being expanded.

In case of smart grids, including renewable energy power generation sources, the basically generated power is also DC power itself, and the DC power is used even in batteries, which store produced power. The demand for low-cost and high-efficiency DC-DC converters is increasing.

As DC-DC converters for high voltage direct current or HVDC as explained above, modular multi-level converters or MMCs are expected to be mainstream products.

The MMC is configured by connecting 2 or 3-level converters in series, including modularized small power IGBTs. In particular, the MMC for HVDC has multiple converter arms, each comprising multiple submodules connected in series.

As it converts DC to DC directly, it shows very low conversion loss, and controls switching operations for harmonic suppression, and therefore, it does not require harmonic filters. Besides, it is easy to allow high capacity and/or high voltage configuration with submodules connected in series. However, very complicated high-speed and high-precision control is required for individual submodules to achieve desired performance. For this, the operation of each individual submodule is controlled itself by a specific program (e.g., operating system or firmware), and if a high-speed and high-precision control process is adjusted by a variety of techniques such as machine learning, a program of each individual submodule is replaced by a new version. Besides, even in case of replacement of a component belonging in the MMC or a component of a power grid or smart grid belonging therein, the program of each individual submodule may be required to be replaced.

By the way, if the program (e.g., operating system or firmware) of the submodule and that of the submodule controller, are replaced or updated, such replacement or update is operated in a way of connecting a separate power supply when the submodule system is not operated, or each user individually using a laptop, etc. In short, during an operation of the HVDC system, firmware update is impossible. Because the power supply of the submodule controller uses the voltage of a capacitor, i.e., a DC capacitor, in the submodule, when the submodule system is not operated, the capacitor does not have any voltage. Therefore, it is necessary to connect the power supply of the submodule controller separately to the outside.

Meanwhile, because it is necessary to secure insulation for safety of the power system, it is impossible to operate the submodule controller by making it separately connected to the outside all the time, instead of being connected with the capacitor in the module.

Accordingly, after the updates of the programs of the submodule and the submodule controller, the separate power supply must be removed, and if an operator failed to disconnect it by mistake, this might cause a safety-related issue.

In addition, the HVDC may be connected with tens, hundreds, or thousands of submodules depending on capacities, and if the program (e.g., operating system or firmware) of the submodule is changed after the installation of such system, the aforementioned problems put burdens on time, costs, personnel, etc.

DETAILED EXPLANATION OF THE INVENTION

Technical Problem

The object of the present invention is to provide a plan for updating a program (e.g., operating system or firmware) of a submodule without connecting a separate power supply even upon an operation of a HVDC system.

Means of Solving the Problem

A submodule for conversion of DC power in accordance with one aspect of the present invention where a plurality of submodules for DC-DC conversion are connected in series comprises: a power switching element for switching DC power supply to convert a source of DC including voltage transformation; a DC capacitor for storing DC power opened or closed by the power switching element; a power supply unit for supplying power required to drive the submodule from the DC capacitor; a submodule controller for controlling whole operation of the submodule; memory for storing data required for operating the submodule controller; and a communicating unit for performing data communication with an external device; wherein the submodule controller may perform update of a program (e.g., operating system or firmware) during a start sequence of the submodule or during a stop sequence thereof, while DC-DC conversion is operated.

Herein, the submodule controller may receive an image file of the program (e.g., operating system or firmware) to be updated from the external device through the communication unit, store it in the memory, and replace the program (e.g., operating system or firmware) with the stored image file if it is successfully stored.

Herein, the memory may include a boot loader area where a running program (e.g., operating system or firmware) is stored, and a submodule including a temporary area where the received image file is stored.

Herein, the communication unit may form an optical communication channel through which data communication with the external device is performed in an optical communication method.

Herein, the submodule controller may include steps of: confirming whether it is necessary to update a program of the submodule; receiving an image file of an updated program version from the external device; temporarily storing the image file of the program; and updating the program by using the image file if being successfully stored temporarily.

A method of updating a program of a submodule in accordance with another aspect of the present invention, as a method performed during a start sequence of the submodule or during a stop sequence thereof at a plurality of submodules for DC-DC conversion connected in series and value base electronics or VBE indicating switching operation to the plurality of submodules according to the indication of a DC-DC conversion operation made by a higher-level device, may comprise steps of: confirming whether it is necessary to update a program of the submodule; transmitting an image file of an updated program version of the submodule to the submodule from the VBE; temporarily storing the image file of the program of the submodule; and updating the program of the submodule by using the image file if being successfully stored temporarily.

Herein, the step of updating the program of the submodule may be performed in a method of copying the image file of the program of the submodule stored in a temporary storage area of the submodule memory at the step of temporarily storing the image file to memory area for booting of the submodule memory.

Herein, it may further comprise a step of confirming whether an error of transmission occurs while the image file of the submodule is temporarily stored.

Herein, the start sequence may be performed in a passive charging zone of the submodule.

Effects of the Invention

A submodule for conversion of DC power with the aforementioned configuration in accordance with the present invention has an effect of allowing update of a program (e.g., operating system or firmware) of the submodule without any separate power supply being connected even upon operation of a HVDC system.

The submodule for conversion of DC power in accordance with the present invention has another effect of improving operational reliability in HVDC systems because it is possible to remove abnormal operating factors of a system caused by software version error.

The submodule for conversion of DC power in accordance with the present invention has the other effect of saving time and costs of updating its program (e.g., operating system or firmware).

DETAILED DESCRIPTION OF THE PREFERRED EMBODIMENTS

Detailed example embodiments to implement the present invention will be explained below by referring to attached drawings.

Upon the explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between then.

The terms used in this specification are used only to explain specific example embodiments and they are not intended to limit the present invention. Unless a context clearly indicates otherwise, any reference to singular noun may include its plural.

In this specification, it can be understood that terms such as include or equip are intended to indicate existence of features, numbers, steps, operations, components, parts or combinations thereof, and existence or audibility of one or more different features, numbers, steps, operations, components, parts or combinations thereof is not excluded.

Besides, for clearer explanation, shapes, sizes, etc. of elements in drawings may be exaggerated.

Figure 1:
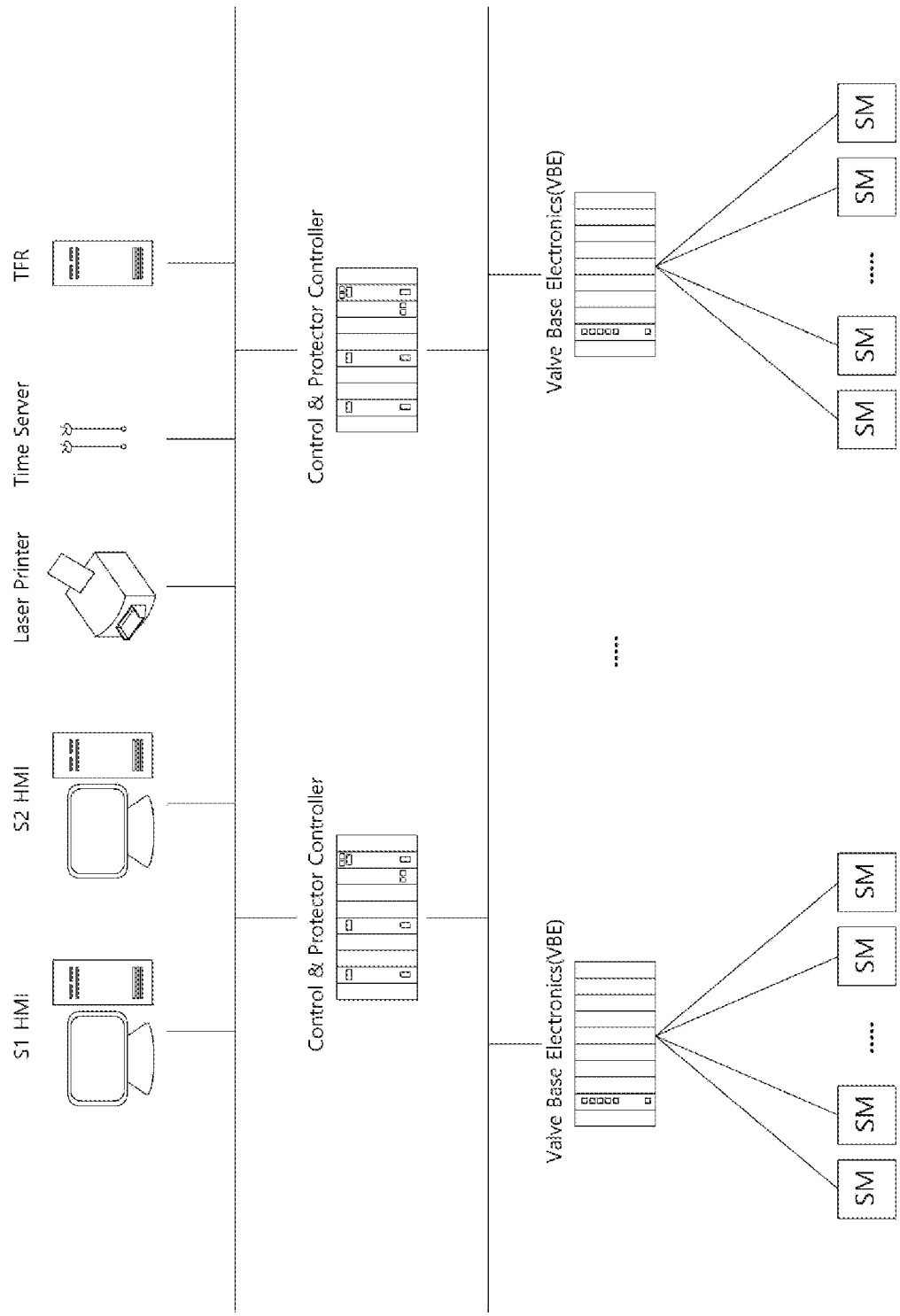
FIG. 1 is a block diagram illustrating hierarchic configuration of a controller of a HVDC system.

FIG. 1 is a block diagram illustrating hierarchic configuration of a controller of a HVDC system.

The highest operator level systems and devices located at the top of the drawing may be those used for universal power management in multiple sets of power grids or a power system connected with a power grid. In accordance with the present invention, HMI manages an integrated operation of HVDCs and MMCs, and performs management of versions and updates of programs (e.g., operating systems or firmware) of power grid equipment including submodules.

At the middle of the drawing, control and protection controllers are located. The control and protection controllers perform system command ramping and status transmission, algorithms for measurement and control of HVDC systems, and algorithms for protection of the power system.

At the lower part of the drawing, Valve Base Electronics or VBEs are located. Through a command obtained from a control and protection controller, a VBE creates an IGBT ON/OFF signal of a submodule, and transmits the information to a submodule controller. More specifically, the VBE performs a role of receiving voltage reference and current direction from the control and protection controller, and creating the IGBT ON/OFF signal in the submodule which is a firing signal.

Figure 2:
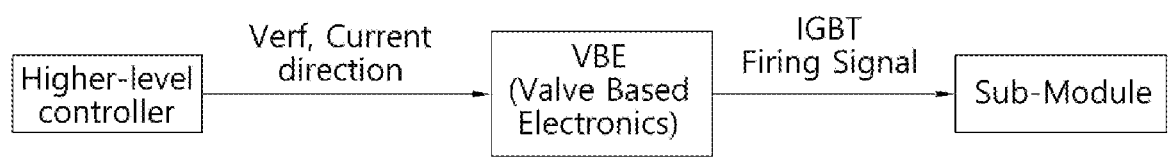
FIG. 2 is a block diagram illustrating a concept of control flow from a higher-level controller to submodules in the hierarchic configuration as seen in FIG. 1.

At the bottom of the drawing are submodules located. The submodule controller which controls whole operation of a submodule turns on or off an internal IGBT. The concept of control flow from the control and protection controller to the submodule is as shown in FIG. 2.

In explanation of the roles of the VBE, the VBE, first, forms an optical communication channel to perform data communication with multiple submodules by one to one. Accordingly, a program (e.g., operating system or firmware) of the submodule controller may be updated using the VBE controller.

At the time, the submodule controller may receive power for driving when voltage is charged over a certain range to a capacitor in the submodule. In other words, when there is no voltage of the capacitor upon the stoppage of the system, the power supply of the submodule controller is shut off.

The submodules of the MMC-based HVDC system illustrated in FIG. 1 constitute the MMC.

Figure 3:
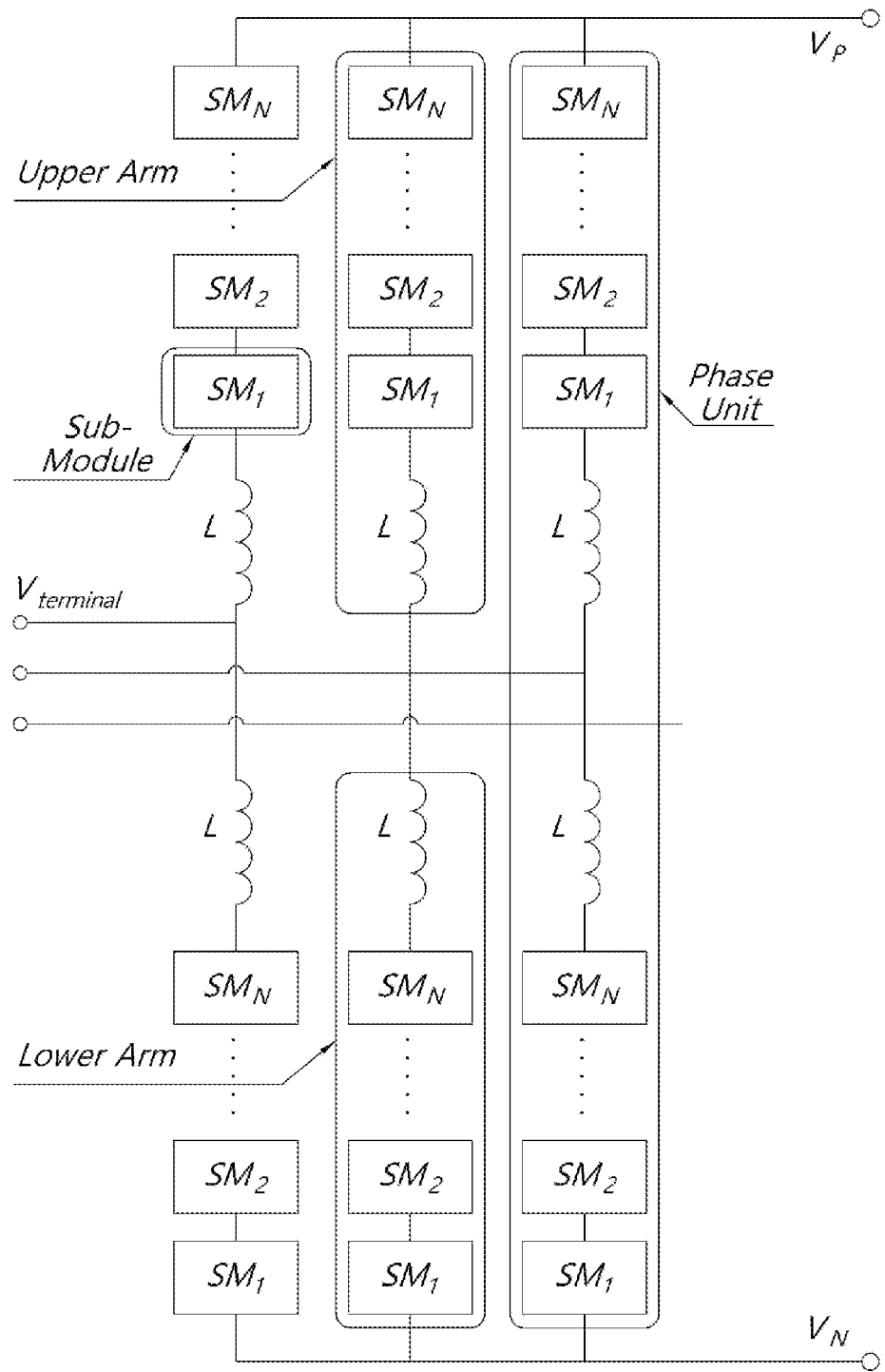
FIG. 3 is a circuit diagram illustrating a basic configuration of an MMC.
Figure 4:
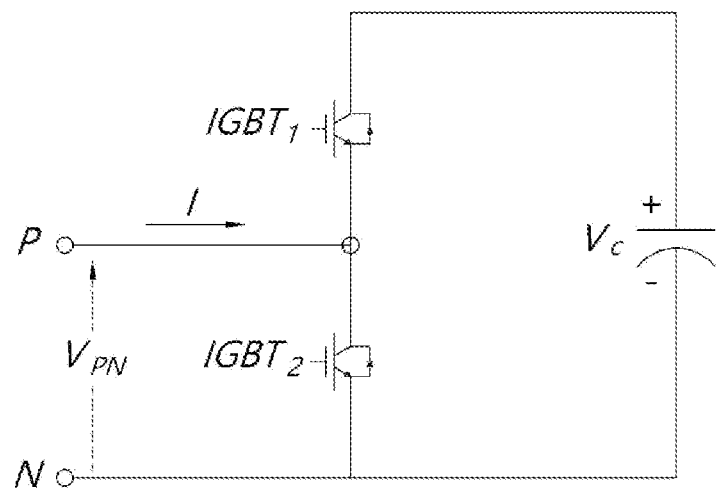
FIG. 4 is a circuit diagram illustrating a basic configuration of each submodule constituting an MMC.

FIG. 3 is a circuit diagram illustrating a basic configuration of an MMC, and FIG. 4 is a circuit diagram illustrating a basic configuration of each submodule constituting an MMC.

The illustrated MMC for HVDC has three phase units, each of which is divided into upper arm and lower arm. It can be found that each arm, i.e., converter arm, has multiple submodules connected in series.

The present invention proposes that the VBE acquires version information of the program (e.g., operating system or firmware) of the submodule controller at a start sequence region, more specifically, passive charging zone, or a stop sequence region during operation sequence of the HVDC system, and if the version is not the latest version, or a version of a specified submodule is different from those of other submodules, the program of the submodule is updated through the VBE.

Figure 5:
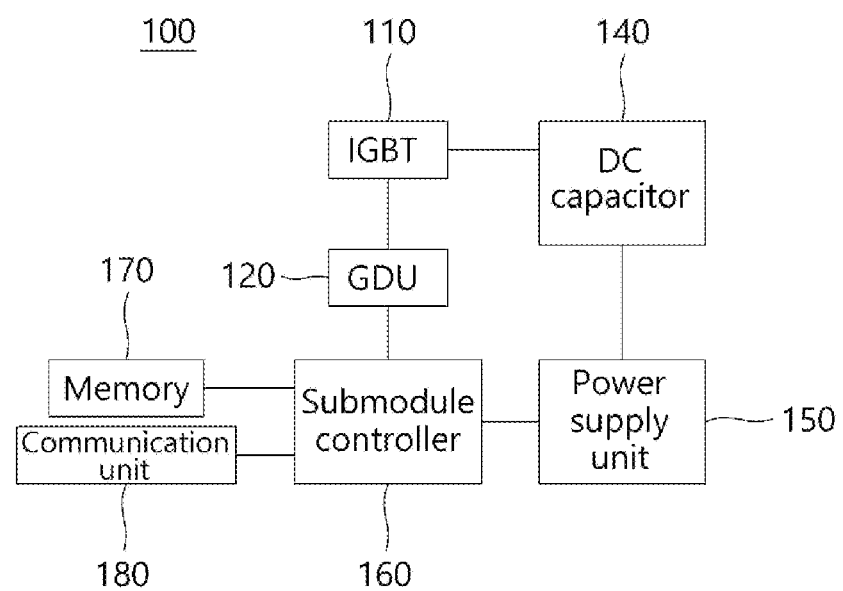
FIG. 5 is a block diagram showing a submodule for conversion of DC power in accordance with one example embodiment of the present invention.

FIG. 5 is a block diagram showing a submodule for conversion of DC power that performs updating the program of the submodule in accordance with the thought of the present invention.

The illustrated submodule for conversion of DC power may be used for DC-DC conversion when a plurality of submodules is connected in series.

A submodule 100 for conversion of DC power as illustrated comprises: a power switching element 110 for switching DC power supply to convert a source of DC including voltage transformation; a DC capacitor 140 for storing DC power opened or closed by the power switching element 110; a power supply unit 150 for supplying power required to drive the submodule from the DC capacitor 140; a submodule controller 160 for controlling whole operation of the submodule 100; memory 170 for storing data required for operating the submodule controller 160; and a communicating unit 180 for performing data communication with an external device.

Herein, the submodule controller 160 in accordance with the thought of the present invention performs updating the submodule program during a start sequence or a stop sequence of the submodule 100 in operation.

More specifically, the submodule controller 160 receives an image file of the program to be updated from the external device through the communication unit 180, stores it in the memory 170, and if the image file is successfully stored, replaces the program by the stored image file.

The power switching element 110 may be composed of IGBTs. As illustrated in FIG. 4, each submodule has at least two IGBTs, and a multi-level converter may have multiple IGBTs.

The DC capacitor 140 is to provide a DC voltage level desired by switching operations of IGBTs. It also provides driving power of the submodule controller 160.

The power supply unit 150 may be configured with a circuit that generates a relatively small driving power from the capacitor.

The submodule controller 160 may be implemented with a CPU, a microcontroller, a MCU, etc. that perform relatively simple control operations. A signal with which the submodule controller 160 turns on or off the power switching element 110 may be converted by a gate drive unit or GDU, not illustrated, to a signal for driving voltage or current of an IGBT gate of the power switching element 110.

The memory 170 may be implemented with a memory element such as flash memory separately equipped, or in a form of memory built in a controller chip constituting the submodule controller 160.

The communicating unit 180 is desirable to be implemented with an optical communication apparatus that performs optical communication for the purpose of securing insulation of power circuit and blocking switching noise. For example, the communicating unit 180 may perform data communication through an optical communication channel with the VBE as illustrated in FIGS. 1 and 2.

A program (e.g., operating system or firmware) for the submodule 100 in accordance with the thought of the present invention may work in a way that the submodule controller 160 performs. For instance, a program may grant a delay time before initiation assigned to each submodule upon performing the switching operation for turn-on or turn-off of an IGBT. (The delay time before initiation may be set a little differently for the purpose of cushioning impact on all MMCs and mitigating noise.) Besides, the program may set minimum or maximum turn-on time permissible to the IGBT of each submodule.

In addition, the program may perform a function of determining aging or failure of the power switching element (IGBT) 110 and/or the capacitor 140 of the submodule or collect data which is the basis for determining aging or failure. The supporting data may be values of temperature, voltage, etc. of the element or accumulated monitored data of voltage or current as a result of the operation of the element.

Furthermore, the program may set a discharging schedule for discharging power charged to the capacitor 140 of each of the submodules.

Moreover, upon replacement of any component, such as IGBT, DC capacitor, GDU, etc., that constitutes the submodule, the program may perform a function of adjusting the existing operation time suitable for the replaced component.

Detailed explanation will be made on time domains, i.e., start sequence and stop sequence, during the process of the operation of the HVDC system. The operating sequences of the HVDC system may be largely classified as seen below.
  (1) Passive charging: At a passive charging zone, the capacitor in the submodule starts to be charged through an initial charging circuit. This zone is the initial zone for charging the capacitor, at which the capacitor has not been charged to the voltage level enough to make the HVDC operable with. At this time, the power can be supplied to the submodule controller with the voltage charged in the capacitor.
  (2) Active charging: As a zone of charging the capacitor in the submodule to the voltage level with which the HVDC can be actually operated through turn-on or off of the IGBT, it is a zone just before the HVDC operation.
  (3) Operation: A zone at which the HVDC system is normally operated.
  (4) System stoppage: As a zone for stopping the HVDC system which completes desired operation, if the system is stopped, the capacitor starts discharging. At the time, it takes at least a few minutes until the capacitor is completely discharged. In other words, the power of the submodule controller is supplied enough for the submodule controller to operate from the time of stopping the HVDC system for at least a few minutes.

Updating the submodule program in accordance with the thought of the present invention may be performed at start sequence, more specifically, at (1) passive charging zone, and/or at stop sequence, which is similar to (4) system stoppage zone.

At first, explanation on start sequence will be made.

Figure 6:
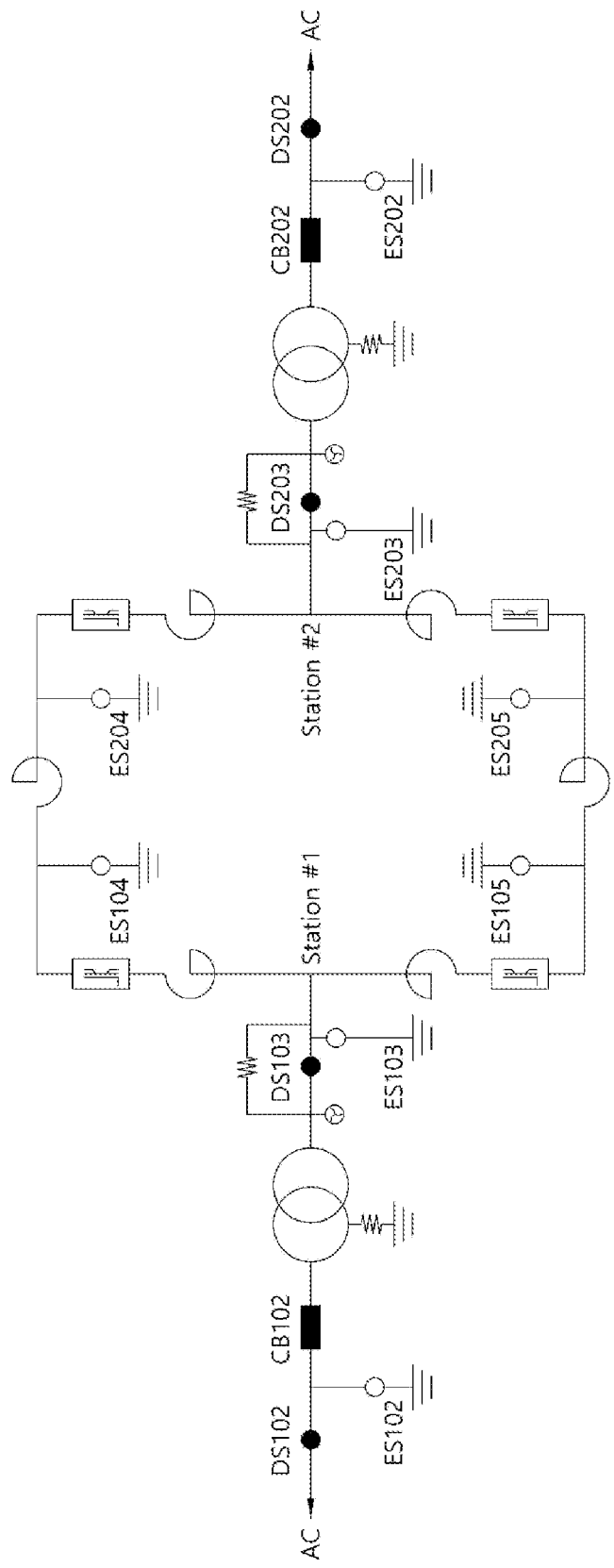
FIG. 6 is a concept diagram of a circuit showing a state of connection between a submodule and a power system at start sequence.
Figure 7:
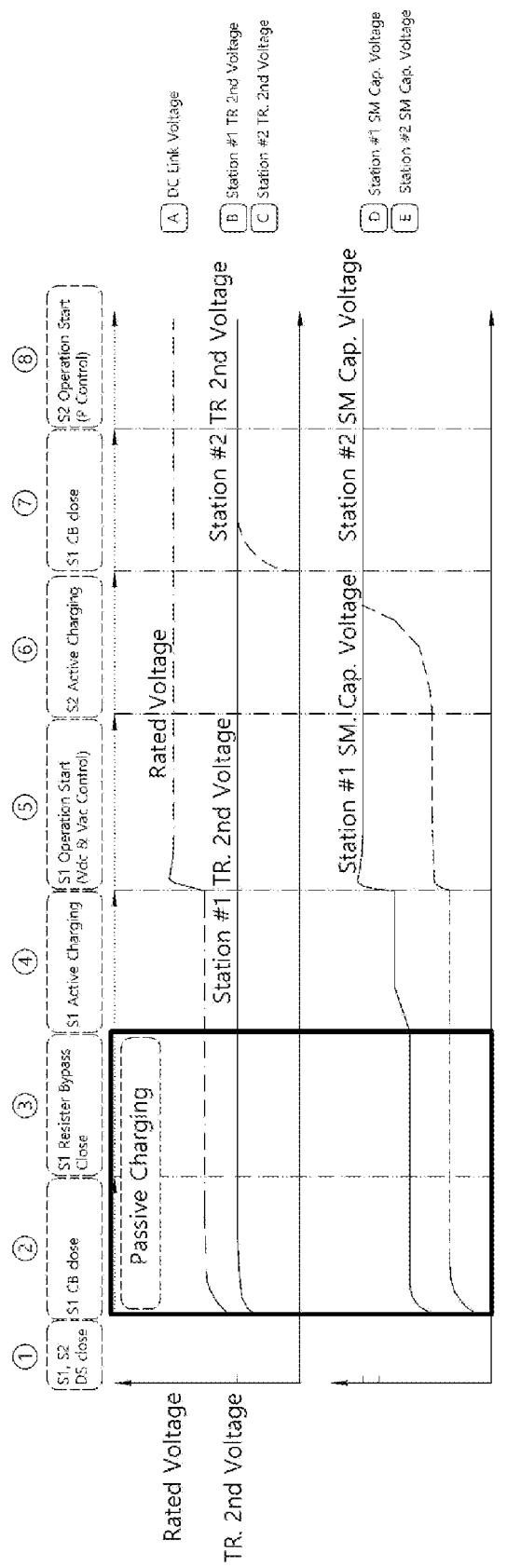
FIG. 7 is a waveform chart illustrating voltage waveforms at start sequence.

FIG. 6 shows a state of connection between a submodule and a power system at start sequence, and FIG. 7 illustrates voltage waveforms at start sequence.

The bold box area in FIG. 7 is a zone excluding the very early area of the (1) passive charging zone as explained above at the time of power being supplied to the submodule controller, and if the voltage of the capacitor in the submodule is charged to the level exceeding certain voltage at the very early area, the power is supplied to the submodule controller.

At the illustrated bold box area for passive charging, as the power is supplied to the submodule controller, the VBE may acquire information on the version of the submodule program from the submodule controller at the passive charging zone. If the acquired version of the submodule program is not the latest version, or a version of a specified submodule is different from those of the other submodules, the program of the submodule may be updated through the VBE.

Meanwhile, the submodule controller in the illustrated bold box area for passive charging does not control the other components in the submodule to secure enough power supply.

Next, explanation on stop sequence will be made.

Figure 8:
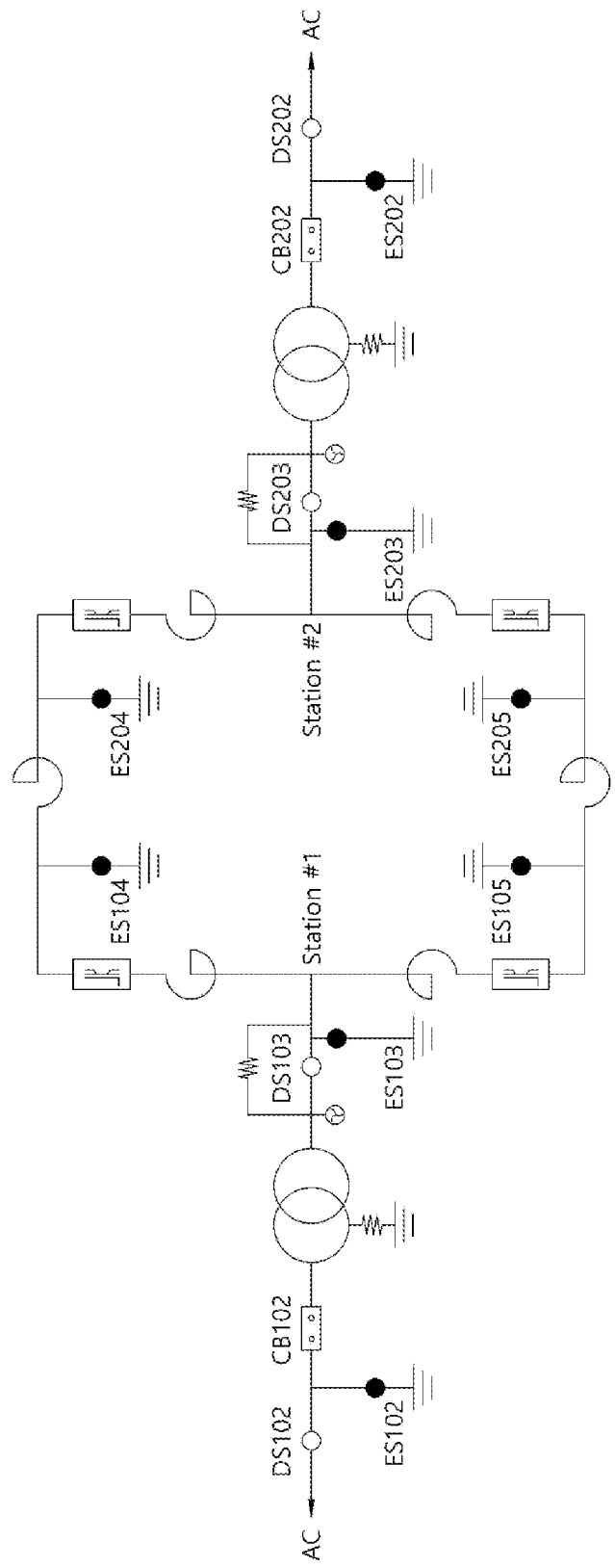
FIG. 8 is a concept diagram of a circuit showing a state of connection between a submodule and a power system at stop sequence.
Figure 9:
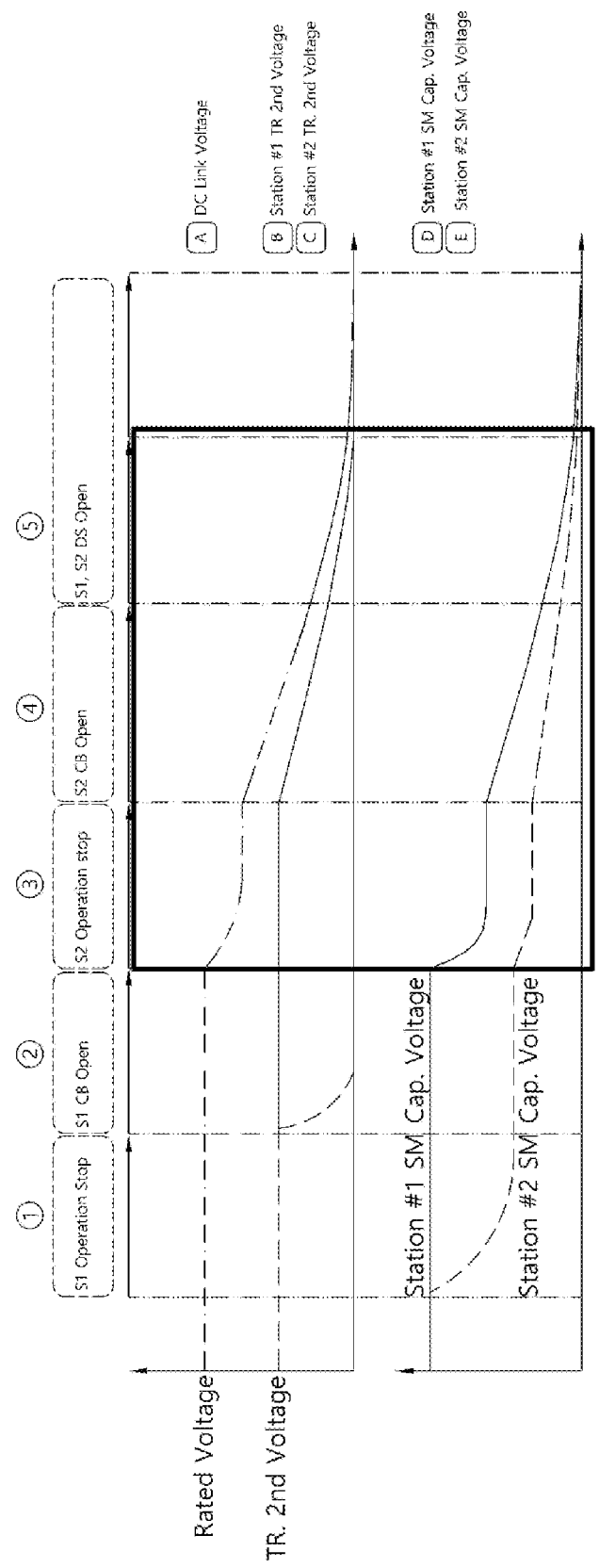
FIG. 9 is a waveform chart illustrating voltage waveforms at stop sequence.

FIG. 8 shows a state of connection between a submodule and a power system at stop sequence, and FIG. 9 illustrates voltage waveforms at stop sequence.

In FIG. 9, the bold box area is a zone from the time of shutting off the power of the submodule controller until the capacitor is discharged too much to supply the power to the submodule controller. In other words, if the voltage of the capacitor in the submodule drops to a certain level or lower, the submodule controller is shut off. Upon the stoppage of the HVDC system, the voltage of the capacitor in the submodule is spontaneously discharged, at which time, it takes a few minutes to tens of minutes to make the submodule controller shut off.

As the power is supplied to the submodule controller in the illustrated bold box area for stop sequence for at least a few minutes, the VBE may update the program of the submodule controller.

Meanwhile, the submodule controller in the illustrated bold box area for stop sequence does not control the other components in the submodule to secure enough power supply.

Figure 10:
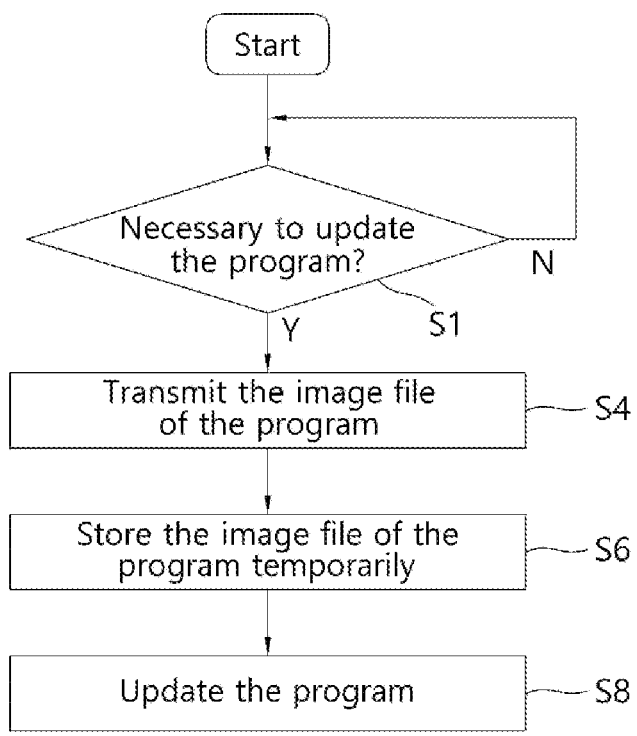
FIG. 10 is a flow chart showing a method of updating a program of a submodule in preparation for any transmission error of an image file of the program of the submodule.

FIG. 10 shows a method of updating a program of a submodule in preparation for transmission error of an image file of the program of the submodule as seen above. The method of updating the submodule program as illustrated is performed by the VBE together with the submodule controller, and the update of the submodule program both at the start sequence and at stop sequence is applicable.

The method of updating the submodule program includes steps of: confirming whether it is necessary to update a program of the submodule at S1; transmitting an image file of an updated program version of the submodule to the submodule from the VBE at S4; temporarily storing the image file of the submodule program in the submodule at S6; and updating the submodule program by using the image file if being successfully stored temporarily at S8.

The step of confirming whether it is necessary to update a program of the submodule at S1 may be determined by the higher-level device than the VBE, and the VBE may be performed by determining existence of a command for updating instructed from the higher level or comparing the latest version of the image file of the submodule program transmitted from the higher-level device with the version of the program reflected on the submodule.

The VBE receives the image file of the updated program version of the submodule from the higher-level device such as the control and protection controller, stores it in the internal storage and then transmits it to the submodule through the optical communication data channel at S4 as illustrated.

At the step of temporarily storing at S6, if receiving the image file of the submodule program from the VBE, the submodule controller stores the image file in the memory. At the time, the image file is stored in memory different from the memory for the boot loader, or even if it is stored in the memory for the boot loader, it is stored at an area other than the area where the image file being used is stored.

In preparation against any error while the image file is received, the newly transmitted image file is not immediately stored in the memory area where the existing image file is stored.

After that, if there does not occur any error while the image file is received, the newly transmitted image file is stored in the memory area where the existing image file is stored, and if the image file is completely stored, a message of reception completed is transmitted to the VBE.

The step of updating the submodule program at S8 may be performed in a way of copying the image file of the program of the submodule stored in the temporary storage area of the memory at the step of temporarily storing it at S6 to the memory area for booting the submodule memory.

The step of updating the submodule program at S8 may include a step of loading the updated program in the method of storing the image file of the submodule program received for updating it in the area of storing an executable file image of the memory for the boot loader and executing the submodule, etc.

If the sequence at which the image file of the submodule program has been replaced is a start sequence at the passive charging zone, the submodule system may be shut off by discharging the voltage of the capacitor in the submodule under a method of loading the updated program. In other words, it gives an effect of resetting the submodule during the start sequence.

In this case, with respect to the submodule, after the start sequence is performed for a while, only the passive charging is performed before the start sequence restarts. As the time at the passive charging zone is very short, it does not give great impact over the operation of the submodule system or the MMC system.

Upon reoperation, if the power is supplied to the submodule, the newly received image file is reflected on the submodule and the submodule controller.

Meanwhile, if the sequence at which the image file of the submodule program has been replaced is a stop sequence, upon the reoperation of the submodule system, the updated image file is reflected and loaded.

Explanation on the process of confirming and transmitting the updated image file of the submodule program will be made.

Figure 11:
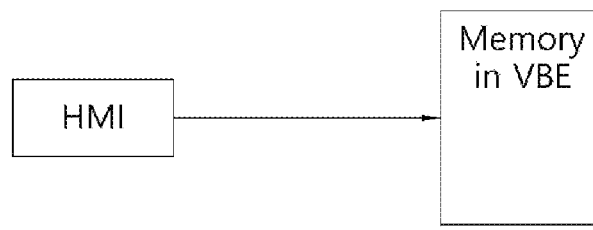
FIG. 11 is a block diagram illustrating that the image file of the program of the submodule is transmitted from HMI at the highest operating system level to VBE in FIG. 1.

FIG. 11 illustrates that the image file of the program of the submodule is transmitted from HMI at the highest operating system level to VBE in FIG. 1. The higher-level controller mediates between the HMI and the VBE, and it was omitted in FIG. 11.

In the illustrated structure, the updated file of the submodule program may be transmitted remotely to the HMI, which may transmit the received updated file to the VBE. In other words, the file of the updated submodule program may be transmitted to the memory in the VBE from the HMI in the operating system of the power system or a set of power grids.

The manager of the HVDC system or the MMC system may remotely transmit the image file of the submodule program to the HMI or store the image file of the submodule program directly in the HMI or in the memory in the VBE.

Moreover, the manager may store the image file of the submodule program directly in the memory in the VBE.

The VBE acquires the version of the program currently in operation through the optical communication with the submodule controller, and if the version of the program is different from the version of the image file of the submodule program stored in the memory in the VBE, the stored image file of the submodule program is transmitted to the submodule controller.

At the time, the update of the programs of all submodule controllers is possible at the same time, and if it is not necessary to update the programs of all submodule controllers, the program of the corresponding submodule only may be updated.

As illustrated, the image file of the submodule program stored in the VBE is transmitted again to multiple submodules connected to the VBE through the optical communication channel. At the time, the submodule in operation performs program update during the start sequence of the submodule or during the stop sequence thereof in accordance with the thought of the present invention.

If there occurs a communication disorder in the optical communication channel between the submodule and the VBE, or the period of start sequence or stop sequence is shortened, all the image file of the program to be updated could not be received. In this case, to prevent damage of the program (e.g., operating system or firmware) of the submodule during the update, the submodule controller may temporarily store the image file if being received from the VBE in the memory for the boot loader.

Figure 12A:
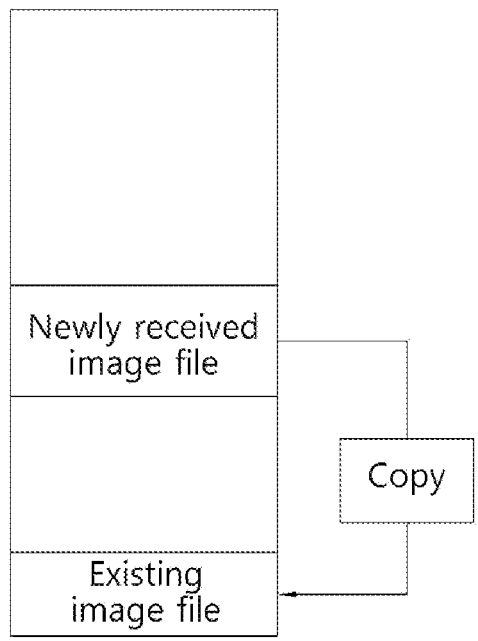
FIG. 12A is a memory diagram illustrating a structure of storing in memory for a boot loader upon normal update.
Figure 12B:
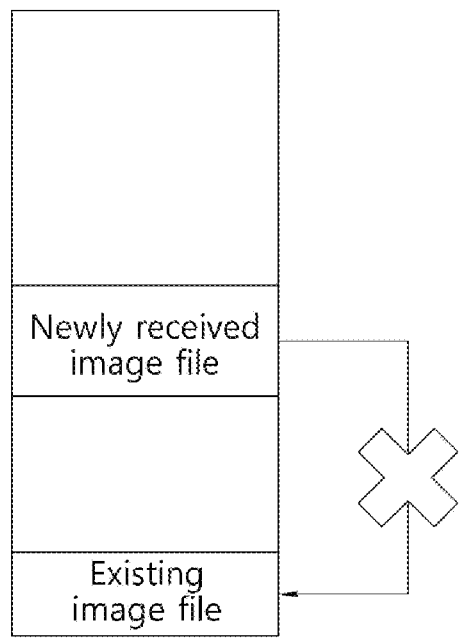
FIG. 12B is a memory diagram illustrating a structure of storing in memory for a boot loader if an error occurs while updating is performed.

FIG. 12A illustrates a structure of storing in memory for a boot loader upon normal update, and FIG. 12B illustrates a structure of storing in memory for a boot loader if an error occurs while updating is performed.

As illustrated, if the submodule controller receives the image file normally, i.e., if it successfully stores it temporarily, the newly received image file of the submodule program is copied in the existing image file storing area, i.e., the area for storing the executable file image in the memory for the boot loader, and the completion message is transmitted to the VBE.

Contrarily, if there occurs an error while the image file is received, the newly received image file of the submodule program is not copied in the existing image file storing area and the error message is transmitted to the VBE.

Figure 13:
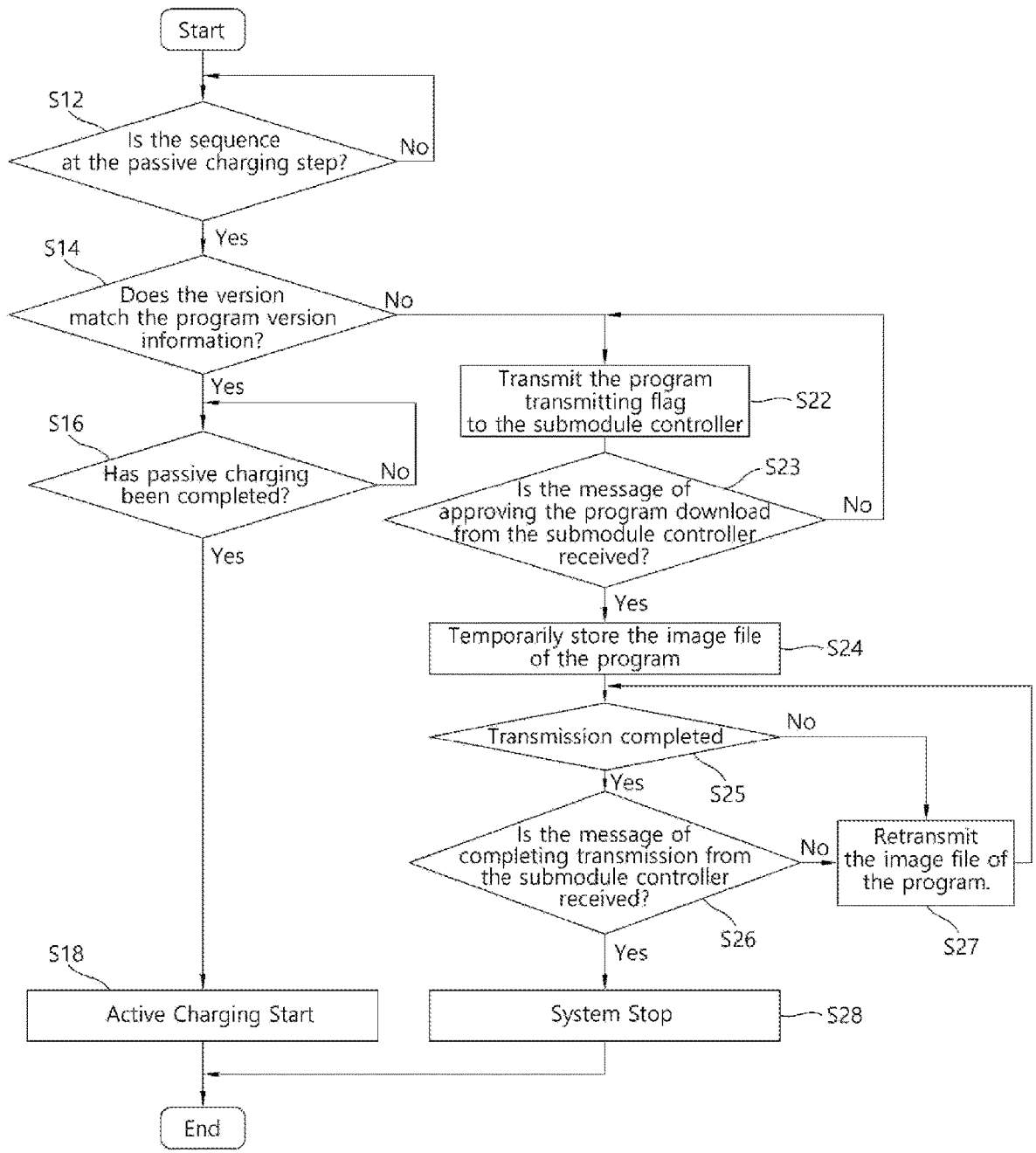
FIG. 13 is a flow chart illustrating operation of a VBE controller that updates a submodule program at start sequence.

FIG. 13 is a flow chart illustrating operation of the VBE controller that updates a submodule program at passive charging zone at start sequence.

Figure 14:
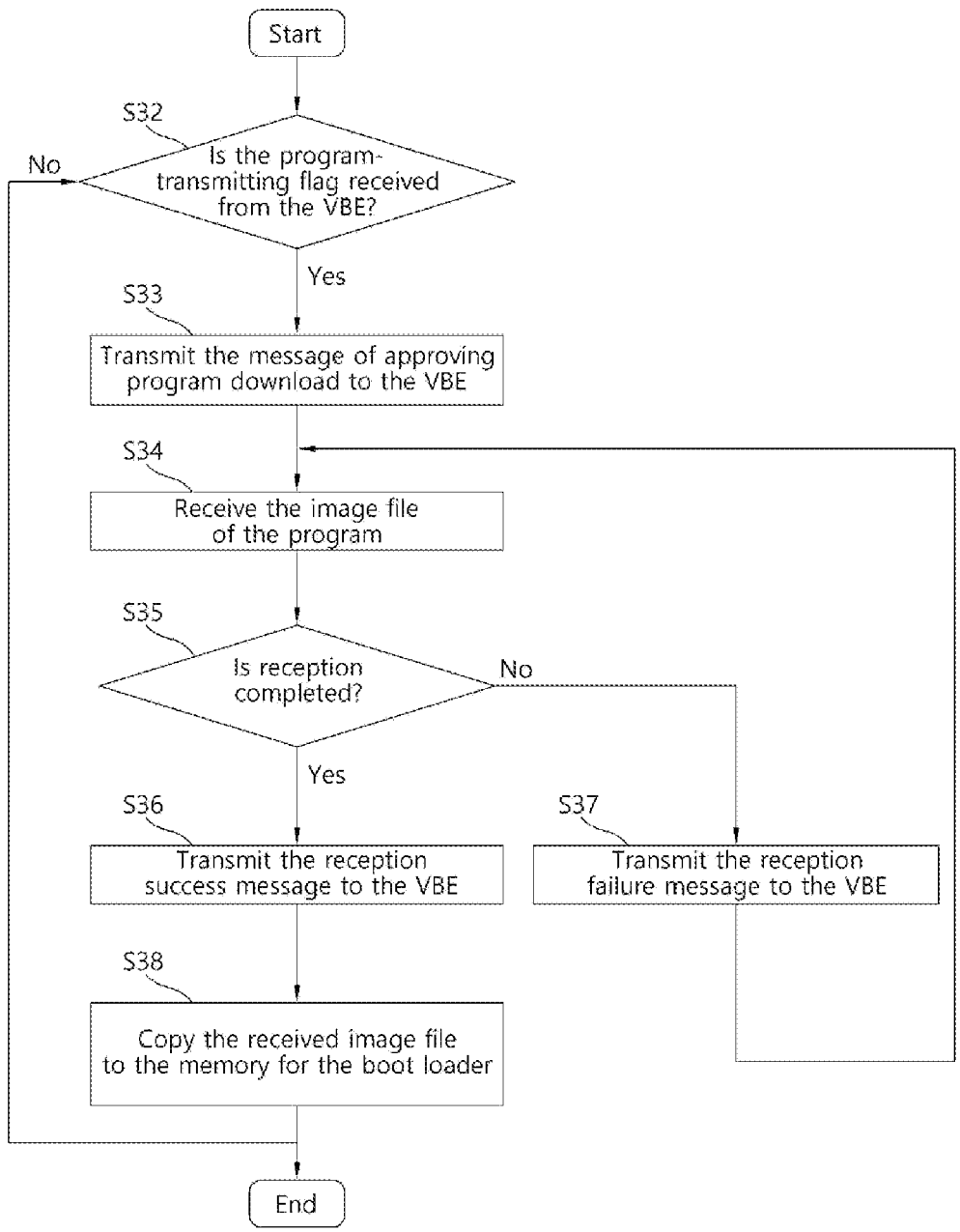
FIG. 14 is a flow chart illustrating operation of a submodule controller that updates a submodule program at start sequence.

FIG. 14 is a flow chart illustrating operation of a submodule controller that updates a submodule program at passive charging zone at start sequence.

Updating in accordance with the illustrated flow chart is only an embodiment example of the process in FIG. 10, and it may be replaced by another form of embodiment to update the program at start sequence.

Steps S12 through S16 are to determine any start sequence at the VBE, necessity to update, and end of the passive charging zone.

At steps S22, S23, S32, and S33 as illustrated, it is agreed to use a program-transmitting flag to update the submodule program between the VBE and the submodule.

Steps S24 and S34 as illustrated show that the image file of the submodule program is transmitted from the VBE to the submodule.

Steps S25 and S26 as illustrated are to determine any update error of the submodule program in the VBE, which is more specifically a failure to transmit the image file of the submodule program, while step S27 represents retransmission of the image file of the submodule program upon any error in updating the submodule program.

Steps S35 and S37 as illustrated are to determine any update error of the submodule program in the VBE which is more specifically a failure to transmit the image file of the submodule program.

Step S38 as illustrated shows that the submodule program is updated under a method of the submodule controller copying the successfully transmitted image file temporarily stored in the memory to the memory for the boot loader where the image file of the running program is stored.

At step S28 as illustrated, the update of the submodule program is normally updated and the update procedure is ended.

Steps S16 and S18 as illustrated show that the passive charging zone at start sequence is ended, and active charging zone starts.

Figure 15:
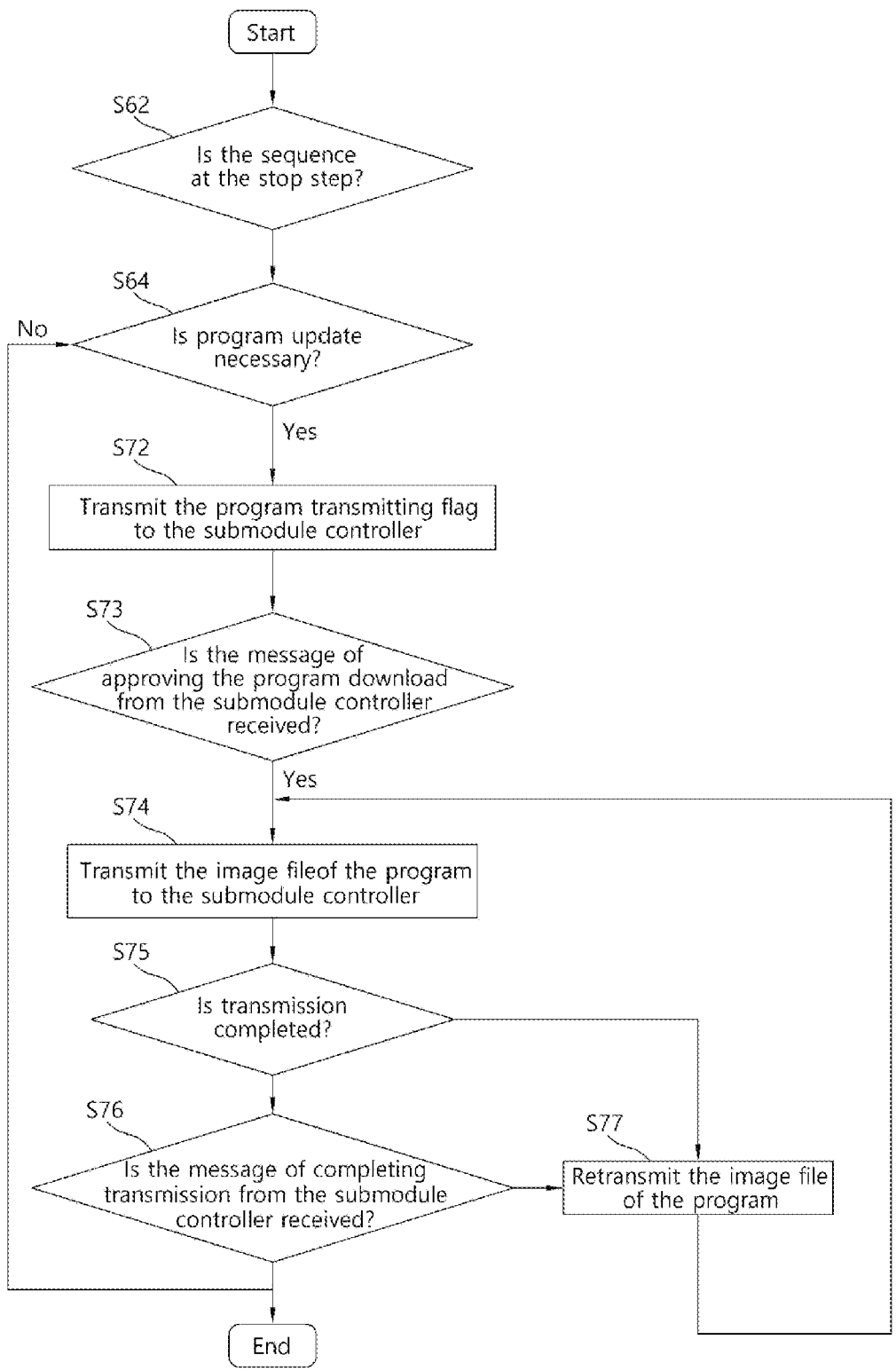
FIG. 15 is a flow chart illustrating operation of a VBE controller that updates a submodule program at stop sequence.

FIG. 15 is a flow chart illustrating operation of a VBE controller that updates a submodule program at stop sequence.

Figure 16:
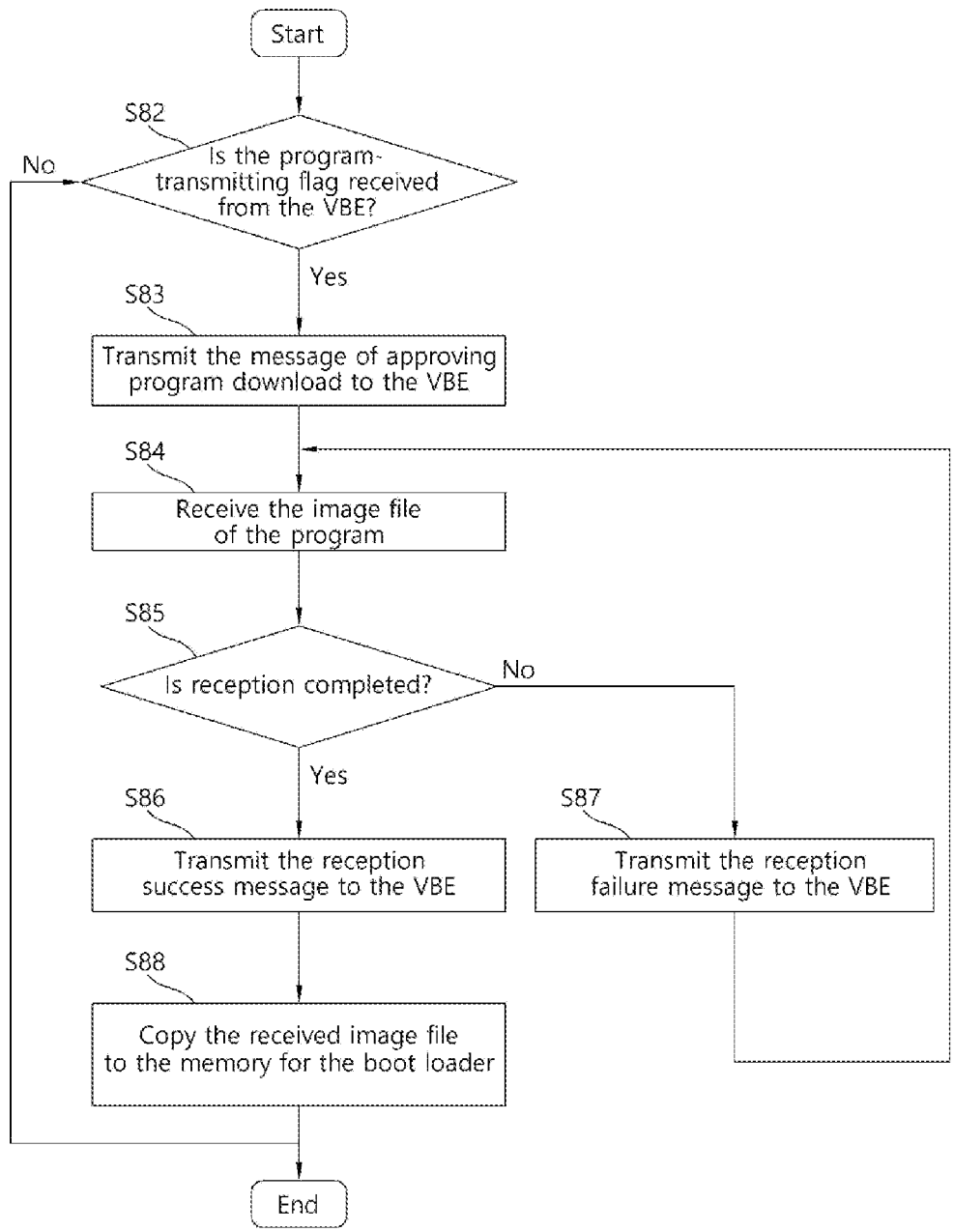
FIG. 16 is a flow chart illustrating operation of a submodule controller that updates a submodule program at stop sequence.

FIG. 16 is a flow chart illustrating operation of a submodule controller that updates a submodule program at stop sequence.

Updating in accordance with the illustrated flow chart is only an embodiment example of the process in FIG. 10, and it may be replaced by other forms of embodiments to update the program at stop sequence.

Steps S62 through S64 are to determine any stop sequence at the VBE, and necessity to update.

At steps S72, S73, S82, and S83 as illustrated, it is agreed to use a program-transmitting flag to update the submodule program between the VBE and the submodule.

Steps S74 and S84 as illustrated show that the image file of the submodule program is transmitted from the VBE to the submodule.

Steps S75 and S76 as illustrated are to determine any update error of the submodule program in the VBE which is more specifically a failure to transmit the image file of the submodule program, while step S77 shows retransmission of the image file of the submodule program upon any error in updating the submodule program.

Steps S85 and S87 as illustrated are to determine any update error of the submodule program in the VBE which is more specifically failure to transmit the image file of the submodule program.

Step S88 as illustrated shows that updating the submodule program is performed in a method of the submodule controller copying the successfully transmitted image file temporarily stored in the memory to the memory for the boot loader where the image file of the running program is stored.

It must be noted that the aforementioned example embodiment is for explanation, not for limitation. Besides, it will be understood by those skilled in the art to which the present invention pertains that a variety of example embodiments are possible within the scope of technical thoughts of the present invention.

REFERENCE NUMBERS

100: Submodule for conversion of DC power
110: Power switching element
140: DC capacitor
150: Power supply unit
160: Submodule controller
170: Memory
180: Communication unit

INDUSTRIAL AVAILABILITY

The present invention relates to a DC-DC converter for HVDC, and is available in the converter field.

What is claimed is:

1. A submodule for conversion of DC power capable of a being connected in series with other submodules and used for DC-DC conversion, comprising:
   a power switching element for switching DC power supply to convert a source of DC, including voltage transformation;
   a DC capacitor for storing DC power opened or closed by the power switching element;
   a power supply unit for supplying power required to drive the submodule from the DC capacitor;
   a submodule controller for controlling whole operation of the submodule;
   memory for storing data required for operating the submodule controller; and
   a communicating unit for performing data communication with an external device;
   wherein the submodule controller performs a program update during a start sequence of the submodule or during a stop sequence thereof, while the DC-DC conversion is operated,
   wherein the start sequence is performed in a passive charging zone of the submodule,
   wherein the power is supplied to the submodule controller when voltage of the DC capacitor in the submodule is charged to a level exceeding a certain voltage at an area of the passive charging zone and the submodule controller for the passive charging zone does not control other components in the submodule to secure enough power supply, and
   wherein the power is supplied to the submodule controller for the stop sequence for a few minutes when the submodule controller for the stop sequence does not control the other components in the submodule to secure the enough power supply.

2. The submodule of claim 1, wherein the submodule controller receives an image file of a program to be updated from the external device through the communication unit, stores it in the memory, and if the image file is successfully stored, replaces the program with the image file.

3. The submodule of claim 2, wherein the memory includes a boot loader area where a running program is stored, and a submodule including a temporary area where the received image file is stored.

4. The submodule of claim 1, wherein the communication unit forms an optical communication channel through which the data communication with the external device is performed in an optical communication method.

5. The submodule of claim 1, wherein the submodule controller performs the steps of:
   confirming whether it is necessary to update a program of the submodule;
   receiving an image file of an updated program version of the submodule from the external device;
   temporarily storing the image file of the program of the submodule; and
   updating the program of the submodule by using the image file if being successfully stored temporarily.

* * * * *